United States Patent [19]
Koppelaar et al.

[11] Patent Number: 5,416,767
[45] Date of Patent: May 16, 1995

[54] METHOD OF TRANSMITTING A DATA STREAM, TRANSMITTER AND RECEIVER

[75] Inventors: Arie G. C. Koppelaar; Constant P. M. J. Baggen, both of Eindhoven, Netherlands

[73] Assignee: U.S. Philips Corporation, New York, N.Y.

[21] Appl. No.: 192,893

[22] Filed: Feb. 7, 1994

[30] Foreign Application Priority Data

Feb. 8, 1993 [EP] European Pat. Off. ............ 93200345

[51] Int. Cl.$^6$ ............................................. H04L 27/26
[52] U.S. Cl. ........................................ 370/23; 370/20; 370/70; 375/260
[58] Field of Search ...................... 370/6.23, 69.1, 70, 370/121, 20; 455/59; 375/12, 14, 18, 38, 40, 58, 101; 371/69.1

[56] References Cited

U.S. PATENT DOCUMENTS

| | | | |
|---|---|---|---|
| 4,641,318 | 2/1987 | Addeo | 375/38 |
| 5,170,413 | 12/1992 | Hess et al. | 375/38 |
| 5,191,576 | 3/1993 | Pommier et al. | 370/69.1 |
| 5,274,629 | 12/1993 | Helard et al. | 375/38 |
| 5,323,391 | 6/1994 | Harrison | 370/70 |

OTHER PUBLICATIONS

Bingham, J. A. C., "Multicarrier Modulation for Data Transmission: An Idea Whose Time Has Come", IEEE Communications Magazine, May 1990, pp. 5-14.

*Primary Examiner*—Benedict V. Safourek
*Attorney, Agent, or Firm*—Edward W. Goodman

[57] ABSTRACT

The invention relates to a method of transmitting data by modulating a frequency multiplex of carriers at a relatively low symbol rate, such as in OFDM (orthogonal frequency division multiplex). According to the inventive method, intersymbol interference is deliberately introduced at the transmitter side to reduce crosstalk between data of different carriers at the receiver side, such as to simplify an equalizing device in a receiver. The intersymbol interference at the transmitter side is introduced after the frequency multiplex modulation has taken place, by repeating groups of output symbols produced by an IFFT transformer and subsequently shaping these repeated groups by means of symbol-by-symbol scaling with coefficients constituting a window function. Subsequent shaped and repeated groups of these output symbols mutually overlap.

3 Claims, 2 Drawing Sheets

METHOD OF TRANSMITTING A DATA STREAM, TRANSMITTER AND RECEIVER

BACKGROUND OF THE INVENTION

1. Field of the Invention

The invention relates to a method of transmitting a data stream comprising subsequent groups of N symbols, N being an integer, said method comprising, for each of said groups, the step of modulating each carrier of a frequency division multiplex of N carriers with a distinct symbol from this group for a period exceeding the periods between subsequent groups, such that the modulation signals of said carriers have a symbol rate at least N times lower than the symbol rate in the data stream and that inter-symbol interference in these modulation signals is deliberately introduced.

The invention also relates to a transmitter and a receiver for cooperation with said transmission.

2. Description of the Related Art

A method of this type is known from U.S. Pat. No. 4,641,318 by Addeo. The known method inter alia provides the possibility of reducing the error probability of data transmission via a channel impaired by Rayleigh fading. According to this method, the symbol period in the modulation signals of the frequency multiplexed careers is rendered larger than the duration of a Rayleigh fading which is characteristic of the channel. It prevents that this fading affects all the information in the transmission signal on a symbol or a sequence of symbols, which may cause irreparable errors in the data received.

The known method basically proposes a combination of two measures for increasing the symbol period in the transmission signal. Firstly, a data stream I having a relatively high bit rate is converted into N parallel sub-data streams at a relatively low bit rate. The symbol period in the sub-data streams is N times Ti, the symbol period in the data stream I. Secondly, the symbols in the sub-data streams are spread over an even longer period than N times Ti. This is effected by time-continuous filtering of the sub-datastreams, such as to smear out the symbol energy in time. The filtered sub-data streams are applied to a frequency multiplex modulating arrangement, such that each of these streams modulate a distinct carrier. Effectively, each symbol of subsequent groups of N symbols in the data stream, modulate a distinct carrier for a duration which exceeds N times Ti.

The resulting transmission signal is a frequency multiplex of data modulated carriers in which the symbol rate is N times lower than that of the data stream, but having inter-symbol interference (ISI) between time-adjacent symbols in the modulation signal of each carrier. This ISI is deliberately introduced at the transmitter side in view of reducing the error probability of the data transmission. This may seem contradictory. However, at the receiver side, the deliberately introduced ISI may be compensated by a suitable chosen form of equalization and/or symbol detection. The basic idea is thus to pre-distort information at the transmitter side and to de-distort it at the receiver side, such as to make the transmission signal less vulnerable to impediments of the transmission channel.

The method proposed by Addeo has the drawback that its implementation requires many components and is consequently expensive and voluminous. The frequency multiplex modulator comprises N modulators with a different carrier frequency for each modulator, preceded by N filtering devices. The modulators receive analog signals, or at least signals in which a considerably larger number of signal levels can be distinguished than in the sub-dam streams at the inputs of the filtering device. A system of N analog modulators for such input signals cannot easily be realized.

Notably, for transmitting data at high bit rates through channels having large delay time differences, the proposed method is not very suitable. An example is terrestrial transmission of video data at a rate of, for example 20 megabits per second, in a mountainous environment, with delay time differences of the order of 10 microseconds. A factor N of approximately 1000 at a minimum is then required to sufficiently increase the symbol period with respect to the characteristic duration of a Rayleigh fading.

SUMMARY OF THE INVENTION

It is an object of the invention to present a method of the type mentioned in the opening paragraph, which may be performed with low-cost and more compact circuits than the circuits needed to perform the known method. It is a further object of the invention to provide a method which is especially suited for transmitting data at high bit rates over large number of frequency multiplexed carriers, by introducing predetermined ISI at the receiver side. It is yet a further object of the invention to provide a transmitter for performing these methods and a receiver for cooperation with said transmitter.

According to the invention, the method indicated in the opening paragraph is characterized in that said step is performed by:
fourier transform type of calculation on the group of symbols, such as to obtain a transformed group of symbols and;
extending said transformed group of symbols by repeating the symbol sequence at least once, such as to obtain an extended transformed group of symbols;
shaping said extended transformed group of symbols with a window function comprising a group coefficients, each symbol of said group being scaled with a distinct coefficient of this window function, such as to obtain a shaped extended transformed group of symbols and;
arranging said shaped extended transformed group of symbols time sequentially, while combining coinciding symbols of other shaped extended transformed groups of symbols originating from groups of symbols in the data stream that are time adjacent to the group.

The invention is based on the recognition that predetermined ISI should be introduced by first modulating frequency multiplex carders without any ISI and then introducing ISI by means of processing these modulated frequency multiplexed careers. This is in contrast with the known method where ISI is introduced in the signals applied to the frequency multiplex modulator. The method according to the invention has the advantage that a relatively simple and well-known type of digital signal processor may be used as a frequency multiplex modulator. For example: Inverse Fast Fourier Transformers (IFFT) or Fast Fourier Transformers (FFT) as described in IEEE Communications Magazine, May 1990, pp. 5 to 14 by J.A.C. Bingham. Such circuits are not applicable in the known method since they require digital input signals, whereas the known method supplies analog input signals to the frequency multiplex modulator. These analog input signals are inherent to the known method, since with the filtering of the sub-data streams for smearing out the symbols thereof, digital-to-analog conversions precedes the frequency multiplex modulator.

The invention has the further advantage that an acceptable reception of a transmission signal generated according to the inventive method, is possible with a relatively simple receiver. Due to delay time differences in the transmission channel, the received signal is distorted. Leading and trailing echoes interfere with the main signal. This may result in crosstalk between modulation signals of the carriers, referred to as Inter-Channel Interference (ICI) and described in the previously cited IEEE article. Especially if the carriers are relatively closely spaced, the ICI significantly extends through many different modulation signals. At the receiver side, it is more difficult to compensate this ICI distortion than ISI distortion. In the invention, it is recognized that by introducing ISI at the transmitter side, the ICI at the receiver side may be confined to the most frequency adjacent channels only. Thus, according to the invention, a favorable exchange can be made between by deliberately introduced ISI and ICI resulting from multipath reception, such as to reduce the complexity of an equalizing device in the receiver arranged between the frequency multiplex demodulator and the symbol detection device.

DESCRIPTION OF THE PREFERRED EMBODIMENTS

Figure 1:
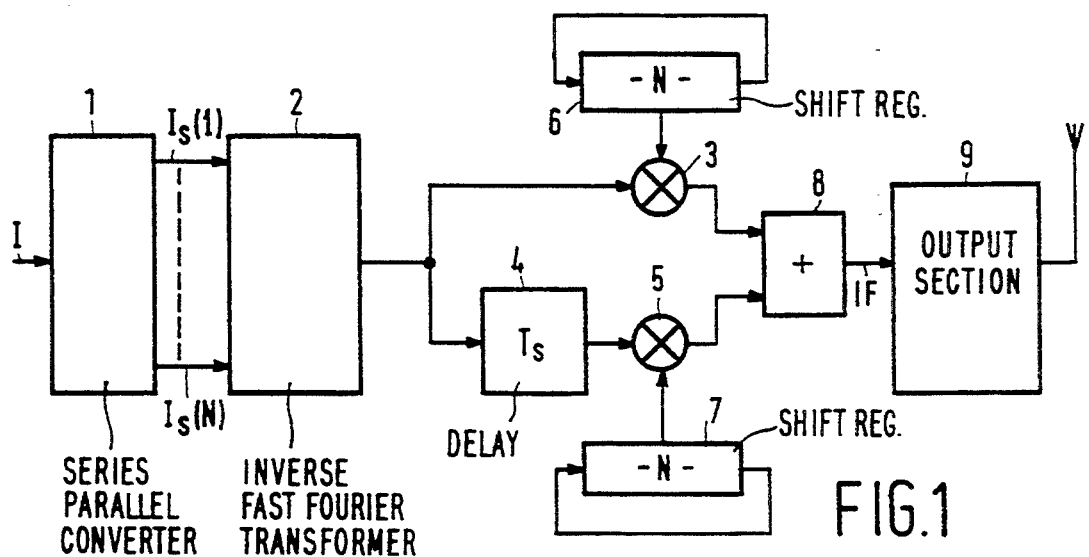
FIG. 1 shows an embodiment of the transmitter for performing the method according to the invention.

FIG. 1 shows an embodiment of a transmitter using the method according to the invention. A serial-to-parallel converter 1 is coupled to an IFFT 2 which is further coupled to a first input of multiplier 3 and, via a delay circuit 4, to a first input of multiplier 5. The second input of multiplier 3 is coupled to shift register 6 and the second input of multiplier 5 is coupled to shift register 7. The outputs of the multipliers 3 and 5 are coupled to a summing circuit 8 which is further coupled to the output section 9.

The IFFT 2 performs an inverse fourier transform calculation on subsequent groups of N symbols in the data stream I supplied to the serial-to-parallel converter 1. The IFFT 2 has a serial output providing IFFT transformed groups of N symbols time sequentially. The serial IFFT output signal comprises a frequency multiplex of data modulated carriers, each career being modulated with a distinct sub-data stream provided by the serial-to-parallel converter 1. IFFT transformed groups are extended by means of the delay circuit 4, delaying the IFFT output signal with a time equal to the period between subsequent groups of symbols in the data stream I. Thus, after IFFT 2 has provided a IFFT transformed group of N symbols, the symbol sequence of this group is repeated once at the output of delay circuit 4.

Shift registers 6 and 7 each comprise a series of N coefficients which traverse these registers at a rate synchronous with the symbol rate at the output of the FFT. Accordingly, each symbol of the IFFT transformed groups is scaled by means of multiplier 3 by a distinct coefficient from register 6, and each symbol of the delayed IFFT transformed groups is scaled by means of multiplier 5 by a distinct coefficient from register 7. The coefficients of register 6 and 7 in succession constitute a window function with which the extended IFFT transformed groups, the non-delayed and delayed symbol sequence of IFFT transformed groups, are shaped. This window function may be viewed as having a pre-cursor, being the coefficient series stored in register 6, and having a post-cursor, comprising the coefficients stored in register 7.

Figure 2:
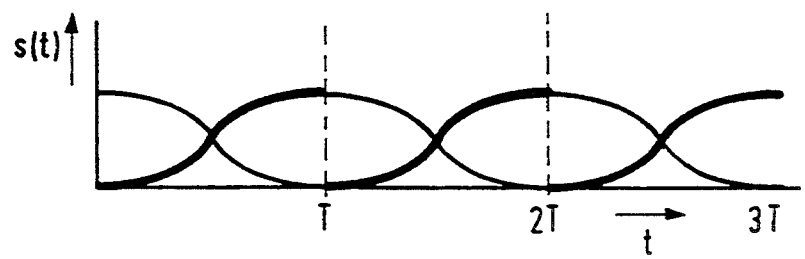
FIG. 2 shows an example of a possible window function.
Figure 3:
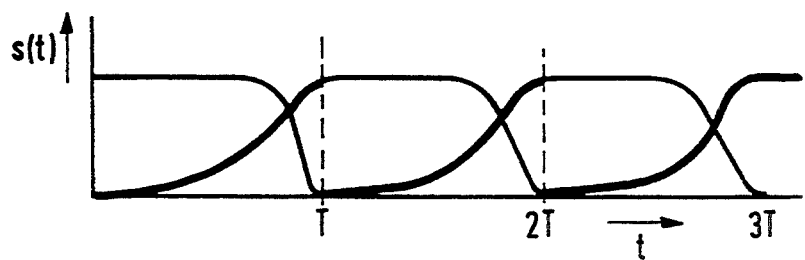
FIG. 3 shows an example of an asymmetrical window function.

FIG. 2 illustrates an example of a pre-cursor and a post-cursor as linked half waveforms drawn with a thin and thick line respectively, and constituting the window function which is the full waveform. In FIG. 2 the pre-cursor and post-cursor are symmetrical with respect to each other, whereas FIG. 3 illustrates an alternative window function in which the pre- and post-cursor is asymmetrical. Both figures also illustrate that when the shaped extended IFFT transformed groups of symbols are combined by means of summing circuit 8, these groups of symbols overlap.

The output signal IF of the summing circuit 8, is supplied to an output section 9, for example a transmitter arrangement. In the output the section, digital output signal may be convened into an analog signal and subsequently filtered to limit the bandwidth, frequency transposed for obtaining a frequency multiplex with higher carrier frequencies, and finally amplified for providing a high power transmission signal to an antenna.

Figure 4:
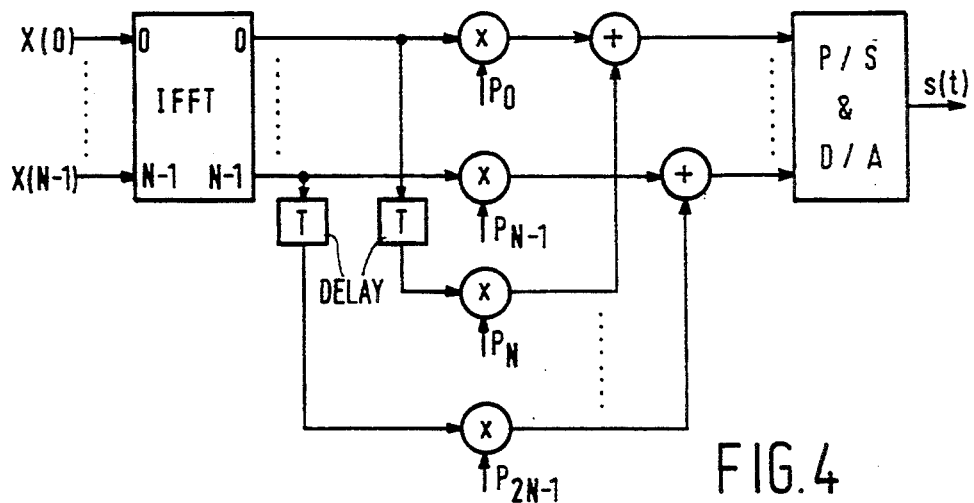
FIGS. 4 and 5 show all embodiments of a transmitter for performing the method according to the invention.
Figure 5:
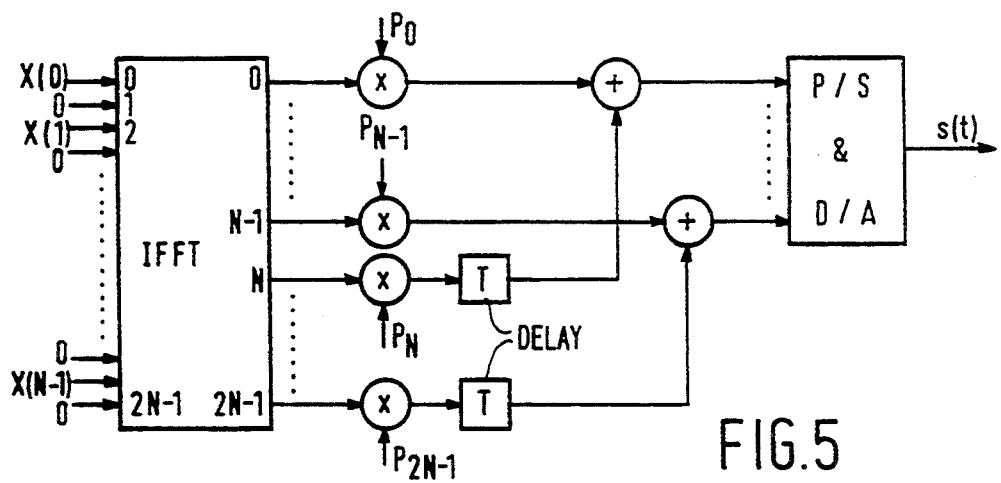

FIGS. 4 and 5 show alternative embodiments of transmitters for performing the method according to the invention. When an IFFT (or FFT) is used as a frequency multiplex modulator, various embodiments may be conceived which emanate from the method according to the invention. In most IFFT circuits a position-sequential transformed group of symbols is convened into time-sequential transformed group of symbols to be supplied at a serial output as illustrated in FIG. 2. However, also prior to this conversion one may perform the method according to the invention as illustrated in FIGS. 4 and 5.

In FIG. 4, the IFFT circuit, which is the block designated with IFFT, periodically transforms subsequent groups of N symbols X(0) .. X(N−1) from a data stream to be transmitted, at a rate equal to that of the groups of symbols in the data stream. The symbols X(0) to X(N−1) of a group are applied position-sequentially at the input of the FIT and the symbols of the IFFT transformed group are provided position-sequentially at the output. Each of the latter symbols is delayed with a delay circuit, designated by T, which may be similar to that in FIG. 2, such as to extend the IFFT transformed group of symbols. The symbols of the extended IFFT transformed group are applied at the input of an army of 2N multiplier circuits, each operated with a distinct coefficient out of a group of coefficients $P_0$ to $P_{2N-1}$. These group of coefficients constitute the window function as previously discussed, with coefficients P0 to $P_{N-1}$ constituting the pre-cursor and $P_N$ to $P_{2N-1}$ the post-cursor.

Thus, the army of multiplier circuits provides a group of 2N symbols constituting a shaped extended IFFT transformed group. Due to the delay circuits T, first the pre-cursor shaped pan of this group is applied to the block designated as P/S & D/A and subsequential the post-cursor shaped pan. Said block comprises a parallel-to-serial converter, which makes that the symbols of the shaped extended IFFT transformed group are supplied time-sequentially to a digital-to-analog converter also present in said block. The block provides a signal, s(t) at its output which corresponds to a signal obtained by subjecting the signal IF in FIG. 1 to an digital-to-analog conversion. It should be noted that the embodiment shown in FIG. 4 is readily derivable from that of FIG. 1, by shifting an output parallel-to-serial converter within IFFT 2 to the input of output section 9.

FIG. 5, shows an alternative to the embodiment of FIG. 4, in which both the IFFT transformation of the symbols X(0) .. X(N−1) and the extension thereof is performed by the IFFT circuit. Compared to the IFFT circuit of FIG. 4, that of FIG. 5 has double the number of inputs and outputs, namely 2N instead of N. The even inputs receive symbols from the data stream, at the uneven inputs, zero symbols are supplied. It will be evident to a person skilled in the art of discrete fourier type of transformations, that with these input symbols, the 'doubled' IFFT circuit will produce an extended transformed group of symbols at outputs 0 to 2N−1. That is, the symbol sequence from output 0 to N−1 is equal to that what is produced by the IFFT in figure 4, but repeated at output N to 2N−1. Like in FIG. 4, the extended IFFT transformed groups of symbols are shaped with a window function and subsequential arranged time-sequentially while combining coinciding symbols of these groups. The latter operations are performed by means of delay circuits T, summing circuits and a parallel-to-serial converter in the fight hand block corresponding to that in FIG. 4.

Figure 6:
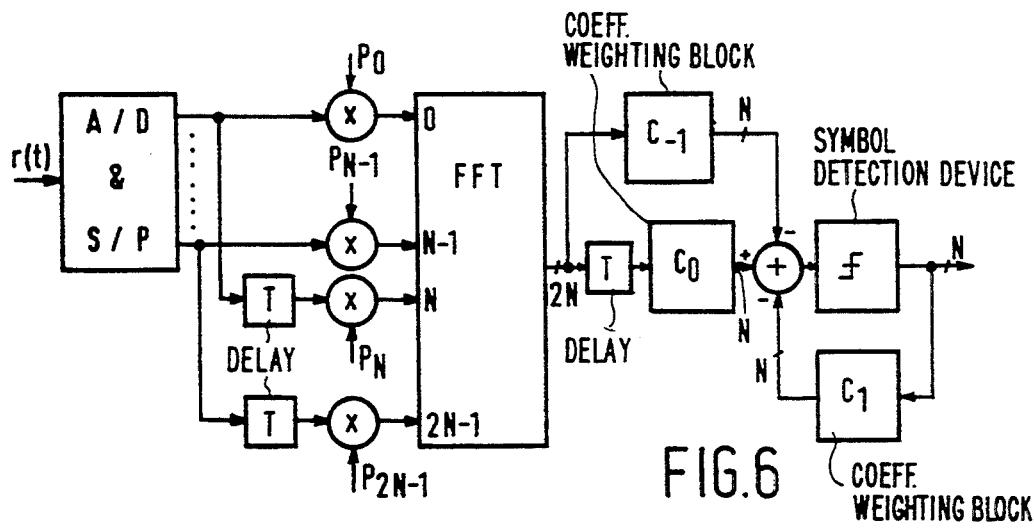
FIG. 6 shows an embodiment of a receiver which cooperates with a transmitter using the method according to the invention.

A receiver which may be used for receiving a transmission signal obtained by performing the method according to the invention is shown in FIG. 6. The block designated as A/D & P/S receives a signal r(t) which is signal s(t) in FIGS. 4 and 5 after is has passed a transmission channel. The transmission channel may comprise various signal paths having different delay times, such that signal r(t) is affected by leading and/or trailing echoes, resulting in ICI. To further reduce the ICI, a technique similar to that in the transmitter is used for smoothing out the abrupt transitions in the signal r(t) which are caused by these echoes. Like for the inventive method previously discussed, this has the advantage of reduced complexity of the equalization device.

Said block provides subsequent groups of N symbols which are extended by means of delay circuits T and shaped by the multiplying each symbol of the extended groups with a distinct coefficient $P_0$ to $P_{2N-1}$. Like at the transmitter side, these coefficients constitute a window function. It should be noted that the window function at the receiver and the transmitter side need not be the same and, moreover, that it is not required to have a receiver of the type shown in FIG. 6, for receiving a transmission signal obtained by performing the method according to the invention.

The shaped extended groups of symbols are supplied to an FFT circuit periodically fast fourier transforming 2N position-sequential input symbols into 2N time-sequential output symbols. The FFT output provides transformed shaped extended groups of symbols time sequentially to a symbol detection device via an equalizing device such as mentioned in the previously cited IEEE article, and which is represented in FIG. 6 by the blocks T, $C_{-1}$, $C_0$, $C_1$, and a summing circuit. The symbol detection device provides the received data stream.

We claim:

1. Method of transmitting a data stream comprising subsequent groups of N symbols, N being an integer, said method comprising, for each of said groups, the step of:

modulating each carrier of a frequency division multiplex of N carriers with a distinct symbol from this group for a period exceeding the periods between subsequent groups, such that the modulation signals of said carriers have a symbol rate at least N times lower than the symbol rate in the data stream and that inter-symbol interference in these modulation signals is deliberately introduced, characterized in that said step is performed by:

performing a fourier transform calculation on the group of symbols thereby forming a transformed group of symbols;

extending said transformed group of symbols by repeating the symbol sequence at least once thereby forming an extended transformed group of symbols;

shaping said extended transformed group of symbols with a window function comprising a group of coefficients, said shaping being performed by scaling each symbol of said extended transformed group of symbols with a distinct coefficient of said group of coefficients of this window function thereby forming a shaped extended transformed group of symbols; and arranging said shaped extended transformed group of symbols time sequentially, while combining coinciding symbols of other shaped extended transformed groups of symbols originating from groups of symbols in the data stream that are time adjacent to the group.

2. Transmitter for transmitting a data stream comprising subsequent groups of N symbols, N being an integer, said transmitter comprising means for modulating, for each of said groups, each carrier of a frequency division multiplex of N carriers with a distinct symbol from this group for a period exceeding the periods between subsequent groups, such that the modulation signals of said carriers have a symbol rate at least N times lower than the symbol rate in the data stream and that inter-symbol interference in these modulation signals is deliberately introduced, characterized in that in said transmitter, said means for modulating comprises:

fourier transform calculators for transforming the group of symbols thereby forming a transformed group of symbols;

means for extending said transformed group of symbols by repeating a sequence of the symbols in the group at least once thereby forming an extended transformed group of symbols;

means for shaping said extended transformed group of symbols with a window function thereby forming a shaped extended transformed group of symbols; and means for arranging said shaped extended transformed group of symbols time sequentially, while combining coinciding symbols of other shaped extended transformed groups of symbols originating from groups of symbols in the data stream that are time adjacent to the group.

3. Receiver for receiving a transmission signal having frequency multiplex data modulated carriers, characterized in that said receiver comprises:

an input section for receiving said transmission signal and for presenting said transmission signal in subsequent groups of symbols;

means for extending each of said subsequent groups of symbols by repeating a sequence of the symbols in each group at least once thereby forming an extended group of symbols;

means for shaping said extended group of symbols with a window function thereby forming a shaped extended group of symbols;

a fourier transform calculator for transforming said shaped extended group of symbols thereby forming a transformed shaped extended group of symbols;

an equalization device for compensating intersymbol and interchannel interference in said transformed shaped extended group of symbols; and a symbol detection device for performing symbol detection on the interference compensated transformed shaped extended group of symbols.

* * * * *